UNITED STATES PATENT OFFICE 2,585,427

PROCESS FOR PREPARING CONDENSATION POLYMERS OF HYDROXYACETIC ACID

Mae L. Beck, Wilmington, Del., assignor to E. I. du Pont de Nemours and Company, Wilmington, Del., a corporation of Delaware No Drawing. Application January 11, 1951, Serial No. 205,609

5 Claims. (Cl. 260—78.3)

This invention relates to a process for preparing condensation polymers of hydroxyacetic acid.

Hydroxyacetic acid, also known as glycolic acid, is capable of various condensation reactions, involving elimination of water, to form a variety of products. Two molecules may condense with elimination of two molecules of water to produce glycolide, a six-membered, lactide-type ring of the formula $C_4H_4O_4$. Hydroxyacetic acid and its condensation products are also readily subject to thermal decomposition followed by tar formation. Such ring-closure and decomposition reactions are difficult to avoid but, under carefully controlled conditions linear condensation products can be formed by repeated esterification reactions between end hydroxyl and carboxyl groups of successive molecules. Linear chains of this type are represented by the following structural formula:

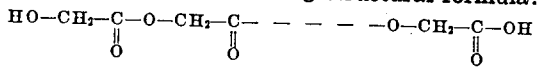

In the copending application of Norton A. Higgins, Serial No. 190,877, filed October 18, 1950, which is assigned to the assignee of the present application, there is disclosed a process for preparing high molecular weight polyhydroxyacetic esters, corresponding to the above general formula, which are suitable for molding into tough shaped articles and melt extruding into strong self-supporting thin films and fibers which can be oriented by drawing to obtain an improvement in strength and other properties. The process comprises heating and distilling water from hydroxyacetic acid at substantially atmospheric pressure and at temperatures of 160° to 230° C. until rapid evolution of water ceases, heating and distilling glycolide from the resulting material under vacuum and at temperatures above the melting point of the material but below 245° C. until appreciable evolution of glycolide ceases, cooling the material, powdering the material, and heating the powder at temperatures above 215° C. but below the melting point for sufficient time to form polyhydroxyacetic esters having the desired plastic properties.

The powder polymerization step of the above process usually takes from 8 to 24 hours at a temperature of about 220° C., depending upon the plastic properties desired. The time required for powder polymerization cannot be shortened by raising the temperature, because the material would fuse and no longer be in powder form. Attempts to produce high molecular weight polymers, suitable for molding into tough, adherent articles or forming into strong orientable fibers or self-supporting thin films, without this relatively long powder polymerization step have not been successful previously. Polymerization essentially stops when the material solidifies unless the material is powdered. If the temperature is raised to keep the material molten, decomposition reactions set in and the material discolors rapidly. Such discoloration can be reduced by the use of stabilizers, such as triphenyl phosphite, but satisfactory polymers have not been prepared by melt polymerization alone prior to the present invention.

It is an object of the present invention to provide a melt polymerization process for producing high molecular weight polyhydroxyacetic esters suitable for melt extrusion into strong orientable fibers or self-supporting thin films. Other objects of the invention will become apparent from the following disclosure and the appended claims.

In accordance with the present invention high molecular weight polyhydroxyacetic esters are prepared by a process which comprises heating and distilling water from hydroxyacetic acid at substantially atmospheric pressure and at temperatures of 160° C. to 230° C. until rapid evolution of water ceases, heating and distilling water and glycolide from the resulting material under vacuum and at temperatures above the melting point of the material but below 230° C. until evolution of water substantially ceases, then adding antimony trifluoride catalyst to the material and heating under vacuum in the presence of triphenyl phosphite stabilizer at temperatures above the melting point of the material but below the temperature at which objectionable discoloration occurs until a polyhydroxyacetic ester of the desired high molecular weight is obtained.

The initial step of the process starts the polymerization reaction and removes resulting water of reaction. This step is preferably carried out at atmospheric pressure. The use of vacuum here would considerably reduce the ultimate yield of polyhydroxyacetic ester because of low molecular weight polymerization products of hydroxyacetic acid distilling over with the water. On the other hand, the use of pressure is not desirable because it favors decomposition of the hydroxyacetic acid, followed by tar formation and discoloration of the ultimate product. Water starts to distill when the temperature reaches about 160° C. but most of the heating is preferably at 195° to 205° C. Heating for any length of time at temperatures below 195° C. unnecessarily prolongs the time required for removal of water in this step, which should only take from 0.5 to 2.5 hours depending upon the temperature and size of the batch. Heating at temperatures above 205° C. favors undesired side reactions, such as the formation of glycolide, which become excessive at temperatures above 230° C.

The second step of the process continues the polymerization until the material is in the form of molecules of considerable chain length, so that a high percentage of the total of possible esterification reactions has taken place. The water formed during these esterification reactions is removed, along with glycolide and other low-molecular weight by-products, by the heating under vacuum. Preferably a high vacuum, within the range of 0 to 5 millimeters of mercury absolute pressure, is used. A vacuum as low as 200 mm. of mercury can be used if an inert gas, such as nitrogen, is used to agitate the material and carry away the by-products.

The preferred heating cycle during the above step is to keep the temperature within the range of 195° to 220° C., raising the temperature as necessary to keep the material molten. A suitable procedure is to heat at about 200° C. for about 1 hour and then raise the temperature to about 220° C. and continue heating until evolution of water substantially ceases. This will generally involve a total heating time under vacuum of about 1 to 4 hours, depending upon the size of the batch.

After completion of the above vacuum heating step antimony trifluoride catalyst is added to the melt. Then heating under vacuum above the melting point of the material is continued until a high molecular weight product is obtained. The presence of triphenyl phosphite stabilizer is also essential for the formation of polymers with minimum discoloration. The stabilizer can be added with the catalyst or can be added at any convenient earlier time, such as the start of the reaction.

A number of catalysts have been tried for melt polymerization, but in general all lead to polymers of relatively low molecular weight and very poor color. Antimony trifluoride is the only known catalyst which makes it possible to prepare satisfactory high molecular weight polymers, i. e., suitable for melt extrusion into orientable films and fibers from hydroxyacetic acid by melt polymerization. However, antimony trifluoride reacts readily with water to form hydrogen fluoride and antimony compounds which are not effective catalysts, such as antimony oxide. Accordingly, antimony trifluoride catalysts is operative only when added to the polymerization mixture after most of the water has been eliminated.

The catalyst concentration is preferably in the range of 0.01 to 0.05 percent, based on the weight of hydroxyacetic acid used, although larger or smaller amounts are operable. For appreciable effectiveness the amount of triphenyl phosphite should be not less than 0.05 percent by weight, based on the hydroxyacetic acid, and the preferred range is 0.1 to 0.3 percent.

Even in the presence of stabilizer the polymer will discolor if the temperature is raised too rapidly. The temperature during the final heating step is preferably maintained only a few degrees above the melting point of the material. A suitable procedure is to heat the catalyzed material at about 220° C. until, after about 2 hours, it becomes necessary to raise the temperature to keep the material molten, then raise the temperature to about 245° C. and continue heating for at least 4 hours, or until the desired degree of polymerization is achieved. While the reaction rate is slower at the lower temperature, it is not desirable to proceed to the higher temperature of 245° C. too soon. A certain molecular weight should be exceeded before the temperature is raised to 245° C. in order to avoid bad color formation.

The most reliable single indication of the plastic properties of a polyhydroxyacetic ester product is the melt viscosity. This is determined by the method of Flory (Jour. Amer. Chem. Soc. 62 1057 (1940)), using a standard temperature of 245° C. to minimize polymer degradation during the determination. Polymer having a melt viscosity as low as 400 poises can be shaped into useful articles, but for melt extrusion into films or fibers the viscosity should be at least 1000 poises in order for the article to be self-supporting near the extrusion orifice. A viscosity of 1000 poises is satisfactory if the polymer is extruded into the desired shape directly from the autoclave in which it is prepared. If the polymer is handled in the presence of air before extrusion, it will degrade during the extrusion and a melt viscosity of at least 2000 poises is required to yield a film of 1000 poises.

The invention will now be illustrated by the following examples, which are not to be construed as limiting the invention.

*Example 1*

A reaction vessel was charged with 40 grams of hydroxyacetic acid dissolved in 17 grams of water. This was heated under atmospheric pressure at 197° to 0.75 hours using a nitrogen stream to stir the mixture. By the end of this time evolution of water had become slow and the pressure was lowered to less than 1 millimeter of mercury absolute pressure. Heating at 197° C. was continued under this vacuum for 1.0 hour while water and glycolide were distilled off. The mixture became increasingly viscous, and when crystals began to appear the temperature was raised to 218° C.

After heating for 2.0 hours under vacuum at 218° C. distillation of water and glycolide had substantially ceased. There were then added to the melt 0.0148 gram of antimony trifluoride and 0.080 gram of triphenyl phosphite. Heating under vacuum at 218° C. was resumed for 2.0 hours, after which the temperature was raised to 245° C. and heating under vacuum was continued for 5.0 more hours. A substantially colorless polyhydroxyacetic ester was obtained which had a melt viscosity of 2100 poises at 245° C.

*Example 2*

A reaction vessel was charged with 40 grams of hydroxyacetic acid, 17 grams of water, 0.0148 gram of antimony trifluoride and 0.080 gram of triphenyl phosphite. This mixture was then heated according to the following cycle:

| Time | Pressure | Temperature |
|---|---|---|
| *Hours* | | ° C. |
| 0.75 | Atmospheric | 197 |
| 1.0 | Vacuum | 197 |
| 4.0 | do | 218 |
| 5.0 | do | 245 |

The only difference between the procedure of this example and that of Example 1 is in the point of addition of catalyst and stabilizer. The procedure of Example 2 yielded a polymer having a melt viscosity of only 490 poises at 245° C.

The above examples show that a much higher molecular weight polymer is obtained when antimony trifluoride catalyst is added after substantially all of the water is removed, including the water of reaction. As far as is known this is the only way to produce polyhydroxyacetic ester by melt polymerization which is of sufficiently high molecular weight to melt extrude into useful self-supporting films and fibers.

As many different embodiments of the present invention may be made without departing from the spirit and scope thereof, it is to be understood that the invention is not limited to the specific embodiments disclosed except to the extent defined in the appended claims.

What is claimed is:

1. A process for polymerizing hydroxyacetic acid which comprises heating and distilling water from hydroxyacetic acid at substantially atmospheric pressure and at temperatures of 160° C. to 23° C. until rapid evolution of water ceases, heating and distilling water and glycolide from the resulting material under vacuum and at temperatures above the melting point of the material but below 230° C. until evolution of water substantially ceases, adding a catalytic amount of antimony trifluoride and not less than 0.05 percent by weight of triphenyl phosphite, and finally heating material under vacuum in the presence of antimony trifluoride and triphenyl phosphite at temperatures above the melting point of the material but below the temperature at which objectionable discoloration occurs until a polymer of the desired high molecular weight is obtained.

2. A process for polymerizing hydroxyacetic acid which comprises heating and distilling water from hydroxyacetic acid at substantially atmospheric pressure and at temperatures of 195° to 205° C. until rapid evolution of water ceases, heating and distilling water and glycolide from the resulting material under a vacuum within the range of 0 to 5 millimeters of mercury absolute pressure and at temperatures above the melting point of the material within the range of 195° to 220° C. until evolution of water substantially ceases, then adding from 0.1 to 0.05 percent by weight of antimony trifluoride and 0.05 to 0.3 percent by weight of triphenyl of phosphite, and finally heating the material under vacuum at temperatures above the melting point but below temperatures at which objectional discoloration occurs until a polyhydroxyacetic ester having a melt viscosity of at least 1,000 poises at 245° C. is obtained.

3. In the process for polymerizing hydroxyacetic acid by heating hydroxyacetic acid under substantially atmospheric pressure at 160° to 230° C. until rapid evolution of water ceases and then heating the resulting material under vacuum at temperatures above the melting point but below temperatures at which objectionable discoloration occurs, the improvement of adding a catalytic amount of antimony trifluoride and not less than 0.05 percent by weight of triphenyl phosphite to the material after most of the water formed by heating under vacuum has been removed and continuing said heating under vacuum at temperatures above the melting point but below temperatures at which objectional discoloration occurs until a polymer of high molecular weight is obtained.

4. In the process for polymerizing hydroxyacetic acid by heating hydroxyacetic acid under substantially atmospheric pressure at 160° to 230° C. until rapid evolution of water ceases and then heating the resulting material under vacuum at temperatures above the melting point but below temperatures at which objectional discoloration occurs, the improvement of adding from 0.01 to 0.05 percent by weight of antimony trifluoride and 0.1 to 0.3 percent by weight of triphenyl phosphite to the material after most of the water formed by heating under vacuum has been removed and continuing said heating under vacuum at temperatures above the melting point but below temperatures at which objectional discoloration occurs until a polyhydroxyacetic ester having a melt viscosity of at least 1000 poises at 245° C. is obtained.

5. A process for preparing a high molecular weight polymer from a lower polymer of hydroxyacetic acid which comprises preparing a mixture of a polymer of hydroxyacetic acid which has been heated under vacuum at temperatures above the melting point but below temperatures at which objectionable discoloration occurs until evolution of water has substantially ceased, a catalytic amount of antimony trifluoride and not less than 0.05 percent by weight of triphenyl phosphite, and heating the mixture under vacuum at temperatures above the melting point but below temperatures at which objectional discoloration occurs until a polymer of high molecular weight is obtained.

MAE L. BECK.

No references cited.